US012222430B2

(12) United States Patent
Chang et al.

(10) Patent No.: US 12,222,430 B2
(45) Date of Patent: Feb. 11, 2025

(54) HIGH-RESOLUTION SOUND SOURCE MAP OBTAINING AND ANALYZING METHOD AND SYSTEM USING ARTIFICIAL INTELLIGENCE NEURAL NETWORK

(71) Applicants: KOREA RESEARCH INSTITUTE OF STANDARDS AND SCIENCE, Daejeon (KR); POSTECH Research and Business Development Foundation, Pohang-si (KR)

(72) Inventors: Ji Ho Chang, Yongin-si (KR); Seung Chul Lee, Pohang-si (KR); Soo Young Lee, Pohang-si (KR)

(73) Assignees: KOREA RESEARCH INSTITUTE OF STANDARDS AND SCIENCE (KR); POSTECH RESEARCH AND BUSINESS DEVELPMENT FOUNDATION (KR)

( * ) Notice: Subject to any disclaimer, the term of this patent is extended or adjusted under 35 U.S.C. 154(b) by 312 days.

(21) Appl. No.: 17/766,476

(22) PCT Filed: May 27, 2021

(86) PCT No.: PCT/KR2021/006616
§ 371 (c)(1),
(2) Date: Apr. 4, 2022

(87) PCT Pub. No.: WO2022/050532
PCT Pub. Date: Mar. 10, 2022

(65) Prior Publication Data
US 2023/0160993 A1 May 25, 2023

(30) Foreign Application Priority Data
Sep. 7, 2020 (KR) .......................... 10-2020-0114089

(51) Int. Cl.
*G01S 3/808* (2006.01)
*G01S 5/22* (2006.01)
(52) U.S. Cl.
CPC .............. *G01S 3/8083* (2013.01); *G01S 5/22* (2013.01)
(58) Field of Classification Search
CPC ........ G01S 5/0278; G01S 5/22; G01S 3/8083; G01S 3/808; G06N 3/04; G06N 3/08; G06T 11/206
See application file for complete search history.

(56) References Cited

U.S. PATENT DOCUMENTS 11,205,440 B2 * 12/2021 Yang ....................... H04S 7/307
11,412,291 B2 * 8/2022 Hur .................. H04N 21/42203
(Continued)

FOREIGN PATENT DOCUMENTS

KR        20-0416803 B1    5/2006
KR     10-2013-0065022 A    6/2013
(Continued)

OTHER PUBLICATIONS

Kujawski, A. et al; "A deep learning method for grid-free localization and quantification of sound sources"; J. Acoust. Soc. Am.; vol. 146, issue 3, Sep. 2019; Published online Sep. 17, 2019; https://doi.org/10.1121/1.5126020.
(Continued)

*Primary Examiner* — An H Do
(74) *Attorney, Agent, or Firm* — DILWORTH IP, LLC (57) ABSTRACT

A method and system for generating a target map for training a neural network and obtaining a sound source map regardless of the maximum number of sound sources, having a short computation time for inference, high spatial resolution and high sound source accuracy. The method includes generating grids each having a spacing within a given range
(Continued)

at positions where sound sources are present in order to form a sound source map, calculating a result value for each of coordinates of the grids so that the result value is a local maximum at the position of a sound source and the result value decreases depending on the distance from the sound source, arranging the result values at positions on matrices corresponding to the respective coordinates of the grids, and generating a target map having an image form by using the result values arranged in on the matrices.

13 Claims, 6 Drawing Sheets

(56) References Cited

U.S. PATENT DOCUMENTS

| | | | |
|---|---|---|---|
| 11,710,497 B2* | 7/2023 | Kim | G10L 25/27 704/205 |
| 2021/0006569 A1 | 1/2021 | Uriel | |

FOREIGN PATENT DOCUMENTS

| | | |
|---|---|---|
| KR | 10-2019-0106902 A | 6/2013 |
| KR | 10-2097641 B1 | 2/2020 |

OTHER PUBLICATIONS

Sarradj, E et al; "A Python framework for microphone array data processing"; Applied Accoustics; vol. 116, 2017, pp. 50-58; http://dx.doi.org/10.1016/j.apacoust.2016.09.015.

Ma, W. et al; "Phased Microphone Array for Sound Source Localization with Deep Learning"; Journal of the Acoustical Society of America Express Letters; Feb. 18, 2018; 7 pages.

International Search Report from WIPO in Application No. PCT/KR2021/006616, dated Sep. 16, 2021, 4 pages.

Zhu, Qinfeng et al., Study on the Evaluation Method of Sound Phase Cloud Maps Based on an Improved YOLOv4 Algorithm, MDPI, Sensors, 20, 4314, 2020, 18 pages.

* cited by examiner

HIGH-RESOLUTION SOUND SOURCE MAP OBTAINING AND ANALYZING METHOD AND SYSTEM USING ARTIFICIAL INTELLIGENCE NEURAL NETWORK

FIELD OF THE INVENTION

The present disclosure relates to a method of obtaining and analyzing a sound source map by using an artificial intelligence neural network, and more particularly, to a method and system for obtaining information on a sound source by generating a target map as means for training a neural network, obtaining a sound source map regardless of the maximum number of sound sources, having a short computation time for inference, high spatial resolution and high sound source accuracy, and analyzing the sound source map.

BACKGROUND OF THE INVENTION

A sound source map is an image on which positions and strengths of sound sources are calculated and displayed on a plane in which the sound sources whose positions and strengths are not known are considered to be present. A conventionally representative example thereof is a beamforming map formed through a beamforming method. Positions and strengths of sound sources are calculated from sound pressure values obtained using a microphone array.

The most conventional method of obtaining a sound source map is to obtain a sound source map by using several beamforming methods, such as delay-and-sum beamforming. The method has an advantage in that it is relatively robust against measurement noise, but has a problem in that it has very low spatial resolution, which makes it difficult to distinguish between neighboring two sound sources as the frequency decreases.

In order to solve the problem, deconvolution methods were developed. The methods improve spatial resolution through repetitive calculation using a point spread function (PSF). The PSF refers to a basic pattern produced by the existing beamforming with respect to one sound source. If the PSF is used, the size of a region occupied by sound sources can be reduced. However, such a method has problems in that the method has accuracy reduced if the PSF is assumed not to be changed depending on a position of a sound source or requires a too long computation time if the PSF is assumed not to be changed depending on a position of a sound source. Furthermore, this method assumes that a sound source is placed on a grid on a sound source map. If a sound source is not actually placed on a grid, the method has a problem in that an error occurs in the PSF, and as a result, the accuracy thereof is reduced.

Recently, methods of obtaining a sound source map using deep learning have been suggested. The methods are roughly divided into grid-based methods and grid-free methods. First, like the deconvolution methods, the grid-based method is a method of, on the assumption that sound sources are placed on a grid, training a deep learning model with respect to the sound sources placed on the grid and applying the trained deep learning model. In this case, this method has two problems in that the number of learning data is limited and the accuracy thereof is reduced with respect to a sound source not placed on the grid. The grid-free method is a method of allowing a deep learning model to derive a position and strength themselves of a sound source as output values without the assumption that sound sources are present on a grid. However, this method has a problem in that the maximum number of sound sources needs to be previously determined. Accordingly, when the number of sound sources is greater than the predetermined number or sound sources are continuous sound sources, it is difficult to obtain the positions and the strengths through the grid-free method. Accordingly, as for a grid-free method having a short computation time, high spatial resolution, and high sound source accuracy, there is a need to develop a method capable of obtaining a sound source map regardless of the maximum number of sound sources.

SUMMARY OF THE INVENTION

Technical Problem

The present disclosure is intended to obtain a sound source map with high spatial resolution, a short sound source computation time, and high sound source accuracy regardless of the maximum number of sound sources in the aforementioned conventional method of obtaining a sound source map using deep learning.

Specifically, the present disclosure is intended to provide a method and system for obtaining a more accurate sound source map by training a neural network through the introduction of a target map.

Technical Solution

The present disclosure relates to a method and system for obtaining and analyzing a sound source map, which generate a target map, use the target map in the training and inference of an artificial intelligence neural network, and analyzes sound source information.

A method of obtaining and analyzing a sound source map according to an embodiment of the present disclosure includes:
a grid generation step of generating grids each having a spacing within a given range at positions where sound sources are present in order to form a sound source map; a calculation step of calculating a result value for each of coordinates of the grids so that the result value is a local maximum at the position of a sound source and the result value decreases depending on the distance from the sound source; a matrix generation step of arranging the result values at positions on matrices corresponding to the respective coordinates of the grids; and a target map generation step of generating a target map having an image form by using the result values arranged in on the matrices.

Furthermore, in the method of obtaining and analyzing a sound source map according to the embodiment of the present disclosure,
the result value can be defined through Equation 1 below:

$$f(R) = \frac{\varepsilon}{R^N + \varepsilon} \quad \text{[Equation 1]}$$

(wherein R means a distance between the sound source and the grid, and N and ε mean constants).

Furthermore, the method of obtaining and analyzing a sound source map according to the embodiment of the present disclosure:
further includes: a target map synthesis a step of, when the multiple sound sources are present, generating target maps for the respective sound sources and synthesizing a target map by the summation of the target maps as one target map.

Furthermore, the method of obtaining and analyzing a sound source map according to the embodiment of the present disclosure further includes:

a neural network training step of designating a beamforming map generated by a sound source as an input value, generating the target map having the same position and strength as the input has, designating the target map as the output value, and training an artificial neural network to output the output value when receiving the input value.

Furthermore, the method of obtaining and analyzing a sound source map according to the embodiment of the present disclosure further includes:

a target map inference step of receiving the beamforming map and inferring and outputting a target map corresponding to the beamforming map by using the artificial neural network; and an analysis step of analyzing the target map and retrieving information of the sound source.

Furthermore, in the method of obtaining and analyzing a sound source map according to the embodiment of the present disclosure, the analysis step further includes: a sound source position extraction step of extracting, from the target map, multiple regions with a given size each having a local maximum value; a finer grid generation step of generating finer grids than that of the target map in each of the regions; and a sound source information retrieval step of retrieving information on each sound source included in each region.

A system for obtaining and analyzing a sound source map according to an embodiment of the present disclosure includes:

a grid generation unit configured to generate grids each having a spacing within a given range around sound sources; a result value calculation unit configured to calculate a result value for each coordinate of the grid so that a result value is a local maximum at the position of a sound source and the result value decreases depending on the distance from the sound source; a matrix generation unit configured to arrange the result values at positions on matrices corresponding to the respective coordinates of the grids; and a target map generation unit configured to generate a target map having an image form by using the result values arranged in on the matrices.

Furthermore, in the system for obtaining and analyzing a sound source map according to the embodiment of the present disclosure, the result value can be defined through Equation 1 below.

$$f(R) = \frac{\varepsilon}{R^N + \varepsilon} \qquad \text{[Equation 1]}$$

(wherein R means a distance between the sound source and the grid, and N and $\varepsilon$ mean constants.)

Furthermore, the system for obtaining and analyzing a sound source map according to the embodiment of the present disclosure further includes:

a target map synthesis unit, wherein, when the multiple sound sources are present, the target map synthesis unit generates, target maps for the respective sound sources and synthesizes a target map by the summation of the target maps as one target map.

Furthermore, the system for obtaining and analyzing a sound source map according to the embodiment of the present disclosure further includes:

a neural network training unit configured to designate a beamforming map generated by a sound source as an input value, generate the target map having the same position and strength as the input has, designate the target map as the output value, and train an artificial neural network to output the output value when receiving the input value.

Furthermore, the system for obtaining and analyzing a sound source map according to the embodiment of the present disclosure further includes:

an inference unit configured to infer and output the beamforming map as the target map corresponding to the beamforming map by using the artificial neural network, and an analysis unit configured to analyze the target map and retrieve information of the sound source.

Furthermore, in the system for obtaining and analyzing a sound source map according to the embodiment of the present disclosure, the analysis unit further includes: a sound source position extraction unit configured to extract, from the target map, multiple regions with a given size each having a local maximum value; a finer grid generation unit configured to split the region into regions each having a spacing smaller than that of the grid of the target map; and a sound source information retrieval unit configured to analyze information for each sound source included in each of the regions.

An embodiment of the present disclosure provides a computer-readable recording medium on which a program for implementing the aforementioned method has been recorded.

Advantageous Effects

According to the method and system for obtaining and analyzing a sound source map which are provided as embodiments of the present disclosure, although a sound source is not present on a grid, it is possible to accurately identify a position of the sound source, and to perform learning more similar to actual learning.

Furthermore, according to the method and system for obtaining and analyzing a high-resolution sound source map which are provided as embodiments of the present disclosure, it is possible to generate learning data necessary to train a neural network without any restriction, and it is not necessary to limit the maximum number of sound sources. Furthermore, it is possible to improve even accuracy of a sound source map.

DETAILED DESCRIPTION OF THE INVENTION

Best Mode

The present disclosure relates to a method and system for obtaining and analyzing a sound source map, which generate a target map, use the target map in the training and inference of an artificial intelligence neural network, and analyzes sound source information in a method and system for obtaining a sound source map.

A method of obtaining and analyzing a sound source map according to an embodiment of the present disclosure includes:

a grid generation step of generating grids each having a spacing within a given range at positions where sound sources are present in order to form a sound source map; a calculation step of calculating a result value for each of coordinates of the grids so that the result value is a local maximum at the position of a sound source and the result value decreases depending on the distance from the sound source; a matrix generation step of arranging the result values at positions on matrices corresponding to the respective coordinates of the grids; and a target map generation step of generating a target map having an image form by using the result values arranged in on the matrices.

Furthermore, in the method of obtaining and analyzing a sound source map according to the embodiment of the present disclosure, the result value can be defined through Equation 1 below.

$$f(R) = \frac{\varepsilon}{R^N + \varepsilon} \quad \text{[Equation 1]}$$

(wherein R means a distance between the sound source and the grid, and N and ε mean constants.)

Furthermore, the method of obtaining and analyzing a sound source map according to the embodiment of the present disclosure further includes: a target map synthesis a step of, when the multiple sound sources are present, generating target maps for the respective sound sources and synthesizing a target map by the summation of the target maps as one target map.

Furthermore, the method of obtaining and analyzing a sound source map according to the embodiment of the present disclosure further includes:

a neural network training step of designating a beamforming map generated by a sound source as an input value, generating the target map having the same position and strength as the input has, designating the target map as the output value, and training an artificial neural network to output the output value when receiving the input value.

Furthermore, the method of obtaining and analyzing a sound source map according to the embodiment of the present disclosure further includes:

a target map inference step of receiving the beamforming map and inferring and outputting a target map corresponding to the beamforming map by using the artificial neural network; and an analysis step of analyzing the target map and retrieving information of the sound source.

Furthermore, in the method of obtaining and analyzing a sound source map according to the embodiment of the present disclosure, the analysis step further includes: a sound source position extraction step of extracting, from the target map, multiple regions with a given size each having a local maximum value; a finer grid generation step of generating finer grids than that of the target map in each of the regions; and a sound source information retrieval step of retrieving information on each sound source included in each region.

A system for obtaining and analyzing a sound source map according to an embodiment of the present disclosure includes:

a grid generation unit configured to generate grids each having a spacing within a given range around sound sources; a result value calculation unit configured to calculate a result value for each coordinate of the grid so that a result value is a local maximum at the position of a sound source and the result value decreases depending on the distance from the sound source; a matrix generation unit configured to arrange the result values at positions on matrices corresponding to the respective coordinates of the grids; and a target map generation unit configured to generate a target map having an image form by using the result values arranged in on the matrices.

Furthermore, in the system for obtaining and analyzing a sound source map according to the embodiment of the present disclosure, the result value can be defined through Equation 1 below.

$$f(R) = \frac{\varepsilon}{R^N + \varepsilon} \quad \text{[Equation 1]}$$

(wherein R means a distance between the sound source and the grid, and N and ε mean constants.)

Furthermore, the system for obtaining and analyzing a sound source map according to the embodiment of the present disclosure further includes:

a target map synthesis unit, wherein, when the multiple sound sources are present, the target map synthesis unit generates target maps for the respective sound sources and synthesizes a target map by the summation of the target maps as one target map.

Furthermore, the system for obtaining and analyzing a sound source map according to the embodiment of the present disclosure further includes:

a neural network training unit configured to designate a beamforming map generated by a sound source as an input value, generate the target map having the same position and strength as the input has, designate the target map as the output value, and train an artificial neural network to output the output value when receiving the input value.

Furthermore, the system for obtaining and analyzing a sound source map according to the embodiment of the present disclosure further includes:

an inference unit configured to infer and output the beamforming map as the target map corresponding to the beamforming map by using the artificial neural network; and an analysis unit configured to analyze the target map and retrieve information of the sound source.

Furthermore, in the system for obtaining and analyzing a sound source map according to the embodiment of the present disclosure, the analysis unit further includes: a sound source position extraction unit configured to extract, from the target map, multiple regions with a given size each having a local maximum value; a finer grid generation unit configured to generate finer grids than that of the target map in each of the regions; and a sound source information retrieval unit configured to analyze information for each sound source included in each of the regions.

An embodiment of the present disclosure provides a computer-readable recording medium on which a program for implementing the aforementioned method has been recorded.

MODE FOR INVENTION

Hereinafter, embodiments of a method and system for obtaining and analyzing a high-resolution sound source map using an artificial intelligence neural network according to the present disclosure and elements involved in operations of the method and system for obtaining and analyzing a sound source map are described as detailed contents for implementing the present disclosure with reference to drawings.

Terms used in this specification are common terms currently widely used and selected by taking into consideration functions in the present disclosure, but the terms may be changed depending on an intention of a technician skilled in the art, a precedent, or the advent of a new technology. Furthermore, in a specific case, some terms are randomly selected by the applicant. In this case, the meaning of a corresponding term will be described in detail in the corresponding description of the invention. Accordingly, terms used in the present disclosure should be defined based on their meanings and contents over the present disclosure, not the simple names of the terms.

Throughout the specification, unless explicitly described to the contrary, when any part "includes (or comprises)" another element, it indicates the further inclusion of other elements, not the exclusion of other elements. Furthermore, the term " . . . unit" or "module" described in the specification means a unit for processing at least one function or operation, and the unit or module may be implemented by hardware or software or a combination of hardware and software. Furthermore, throughout the specification, when it is described that one part is "connected" to another part, the one part may be "directly connected" to the another part or may be connected to the another part "with a still another part interposed therebetween."

Embodiments of the present disclosure are described hereinafter in detail with reference to the accompanying drawings in order for a person having ordinary knowledge in the art to which the present disclosure pertains to easily carry out the present disclosure. However, the present disclosure may be implemented in various different ways, and is not limited to the embodiments described herein. In the drawings, in order to clearly describe the present disclosure, parts unrelated to the description are omitted, and similar reference numbers are used to refer to similar parts throughout the specification.

Figure 1:
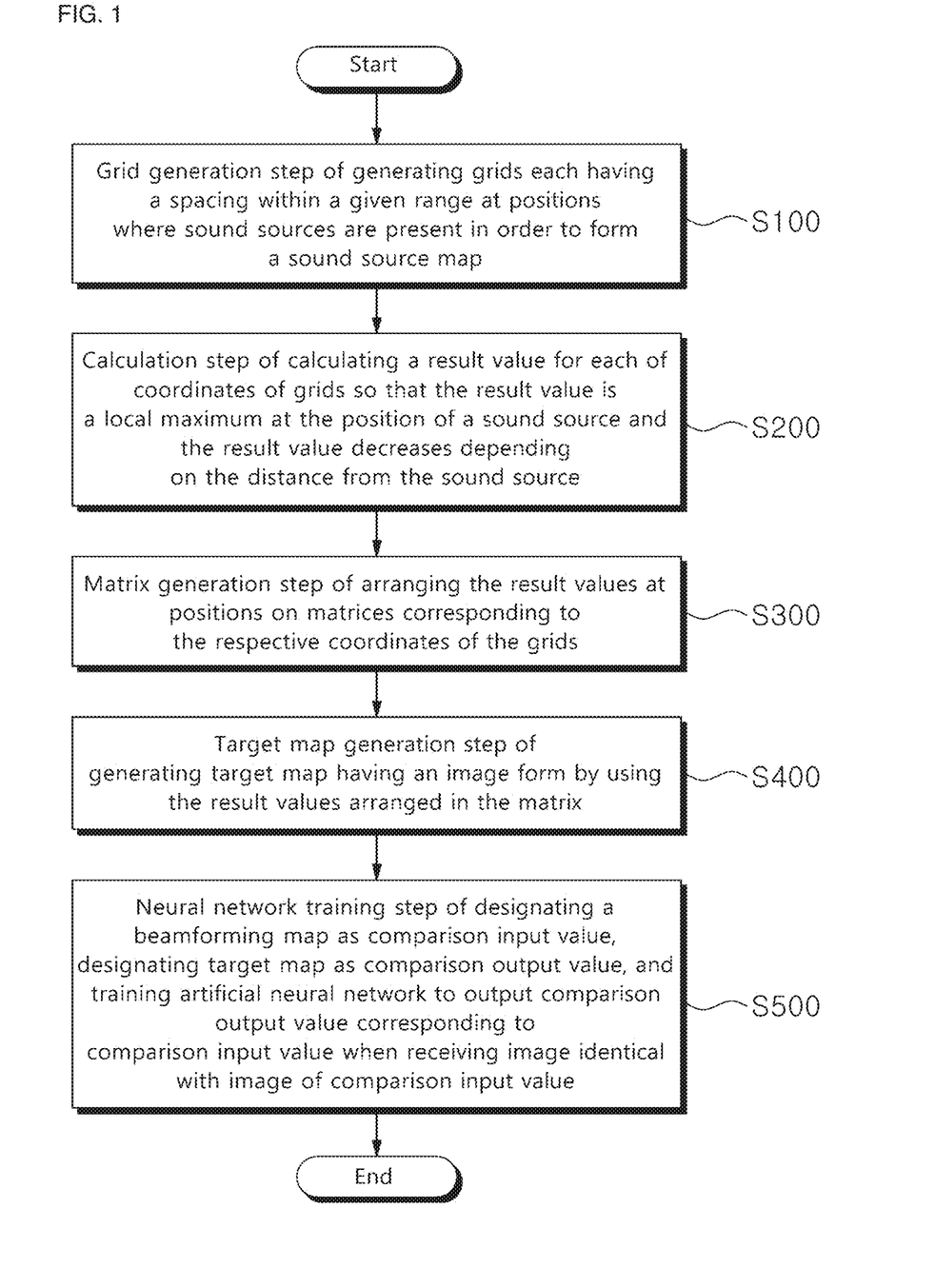
FIG. 1 is a flowchart of a method of obtaining and analyzing a sound source map, which generates a target map, according to an embodiment of the present disclosure.

FIG. 1 is a flowchart of a process of generating a target map, in a method of obtaining and analyzing a sound source map according to an embodiment of the present disclosure.

Referring to FIG. 1, the method of obtaining and analyzing a sound source map according to the embodiment of the present disclosure includes a grid generation step S100 of generating grids each having a spacing within a given range at positions where sound sources are present in order to form a sound source map, a calculation step S200 of calculating a result value for each of coordinates of the grids so that the result value is a local maximum at the position of the sound source and the result value decreases depending on the distance from the sound source, a matrix generation step S300 of arranging the result values at positions on matrices corresponding to the respective coordinates of the grids, and a target map generation step S400 of generating a target map having an image form by using the result values arranged in on the matrices.

Furthermore, in the method of generating a target map according to the embodiment of the present disclosure, if multiple sound sources are present within a specific region from which the sound source map will be obtained, a target map synthesis step S410 of generating target maps for the respective sound sources and then synthesizing a target map by the summation of the target maps as one target map may be further included in the target map generation step S400.

That is, if multiple sound sources are present, a sound source map may be obtained without restriction to the number of sound sources through a method of generating target maps for the respective sound sources through the method of generating a target map according to the embodiment of the present disclosure, and then synthesizing a target map by the summation of the target maps as one target map.

Furthermore, the method of obtaining and analyzing a sound source map according to the embodiment of the present disclosure may further include a neural network training step S500 of designating a beamforming map generated by a sound source as an input value, generating the target map having the same position and strength as the input has, designating the target map as the output value, and training an artificial neural network to output the output value when receiving the input value.

That is, the method may further include a step of training the neural network to learn a target map corresponding to a beamforming map having information on a given sound source. Accordingly, the method may obtain a sound source map including sound field information through an accurate and simple method even without performing a complicated conversion process having a long computation time in order to obtain the sound field information from the beamforming map.

A method of training the artificial intelligence neural network may be modified in various ways in the type (i.e., a model constituting the artificial intelligence neural network) of artificial intelligence neural network as long as the method is capable of performing the neural network training step S500.

Figure 2:
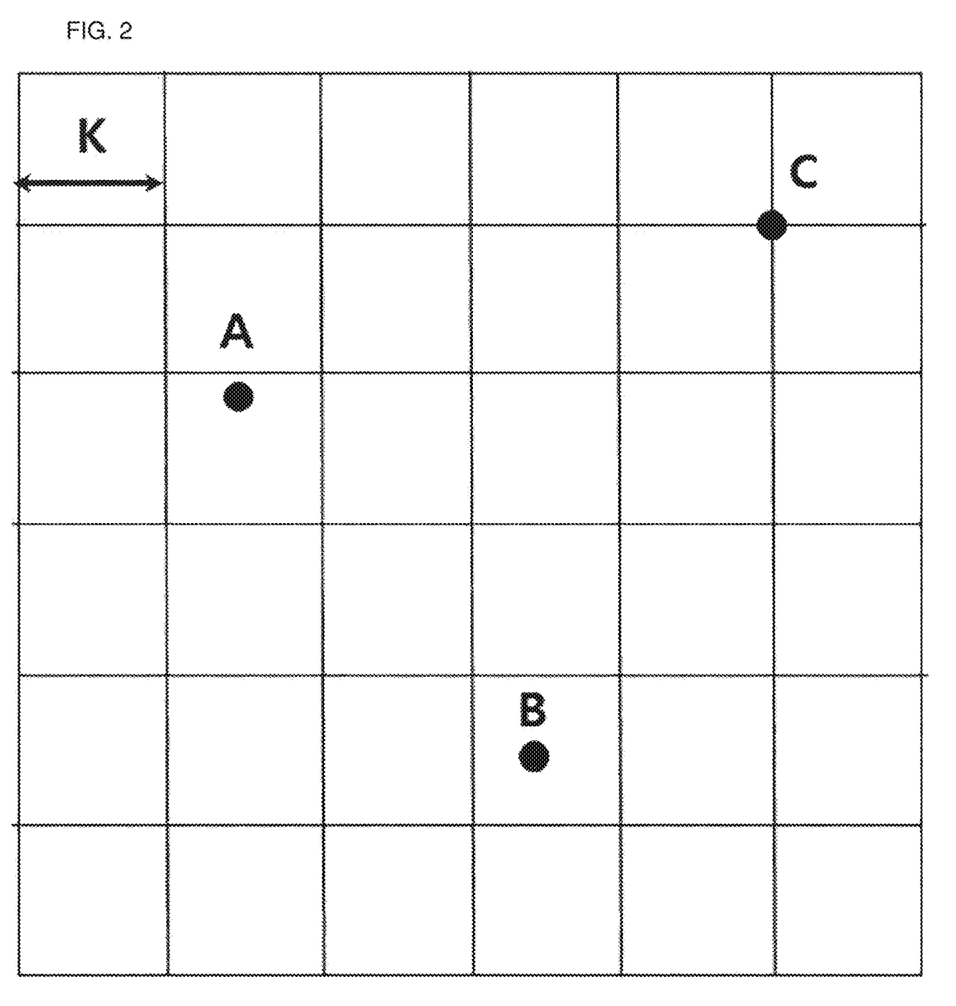
FIG. 2 illustrates that grids are generated around sound sources in the method of generating a target map according to the embodiment of the present disclosure.

FIG. 2 illustrates that grids are generated around sound sources in the method of generating a target map according to the embodiment of the present disclosure.

FIG. 2 shows the forms of grids generated by the grid generation step S100. If grids each having a spacing X within a given range are generated with respect to a specific region in which given sound sources are present as in FIG. 2, a given sound source (or sound sources) is not placed on a grid like a sound source A and a sound source B or is placed on a grid like a sound source C.

In this case, as the size of the interval X is reduced, a more accurate sound source map may be obtained, but a computation time is increased. As the size of the interval X is increased, a computation time taken to obtain a sound source map may be decreased, but accuracy of the sound source map may be slightly reduced. In the method of generating a target map according to the embodiment of the present disclosure, a preferred range of the interval X will be determined as a proper size through repetitive experiments.

Figure 3A:
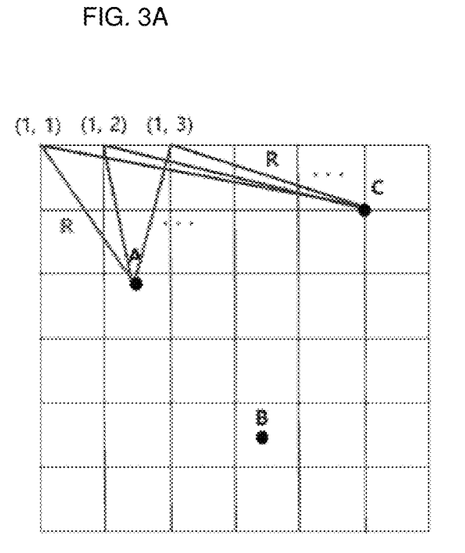
FIGS. 3A and 3B illustrate a process of calculating result values in the method of generating a target map according to the embodiment of the present disclosure.
Figure 3B:
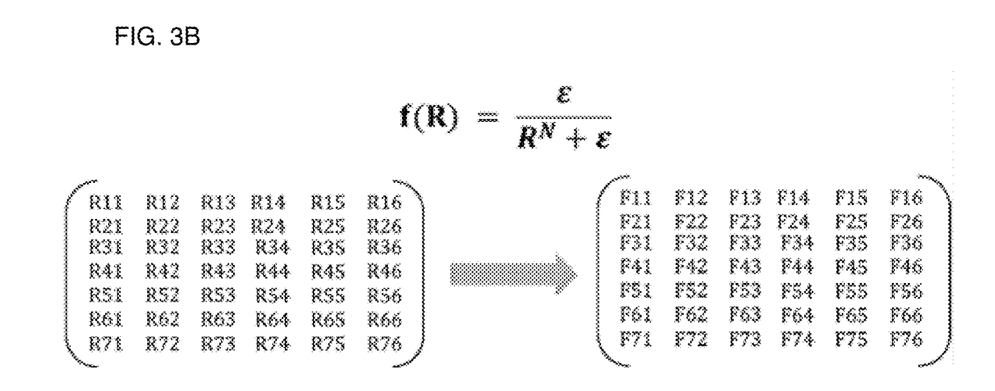

FIGS. 3A and 3B illustrate a process of calculating result values in the method of generating a target map according to the embodiment of the present disclosure.

Referring to FIG. 3A, in the calculation step S200, a result value F is calculated from a distance R between each coordinate of a grid generated in the grid generation step S100 and a corresponding sound source (A, B or C).

In this case, the result value F means a specific value of each pixel within an obtained sound source map, and can be calculated based on the distance R between a sound source and each coordinate of the grid as in Equation 1 below. In Equation 1 for calculating the result value F, ε corresponds to a constant and functions to prevent a result value from becoming infinite when the distance R between a coordinate and a sound source is 0.

Furthermore, in the calculation of the result value F, a rate of change of the result value F according to the distance R may be adjusted by adjusting the size of a constant N. That is, a difference between positions or strengths of sound sources within a sound source map can be more clearly indicated in a way to increase a rate of change of the result value F according to the distance R by setting the constant N as a relatively great value. However, in the method of generating a target map according to the embodiment of the present disclosure, a preferred size of the constant N will be determined as a proper size through repetitive experiments.

$$f(R) = \frac{\varepsilon}{R^N + \varepsilon} \quad \text{[Equation 1]}$$

wherein R means a distance between the sound source and the grid, and N and ε mean constants.

In the matrix generation step S300, the result values F calculated using the distance R and Equation 1 are arranged at positions on matrices corresponding to the grids used to calculate the result values in the calculation step S200. Furthermore, a matrix having the same size as the size of the grids generated in the grid generation step S100 is generated by repeating the calculation step S200 and the matrix generation step S300 until result values for all coordinates are calculated.

Referring to FIG. 3B, as in the aforementioned embodiment of the present disclosure, in addition to the method of generating a matrix after calculating a result value by using a distance, various modified methods may be used within a target range of the present disclosure as long as the methods are capable of indicating, as a matrix, a result value calculated using a distance and an equation. For example, there is a method of applying Equation 1 for deriving the result value F to a matrix after generating the matrix by measuring the distance R between each coordinate and a sound source.

Figure 4A:
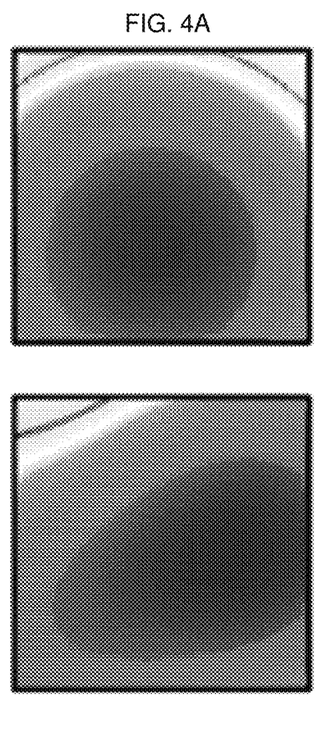
FIG. 4A is a beamforming image used as an input value in order to train a neural network according to the embodiment of the present disclosure.
Figure 4B:
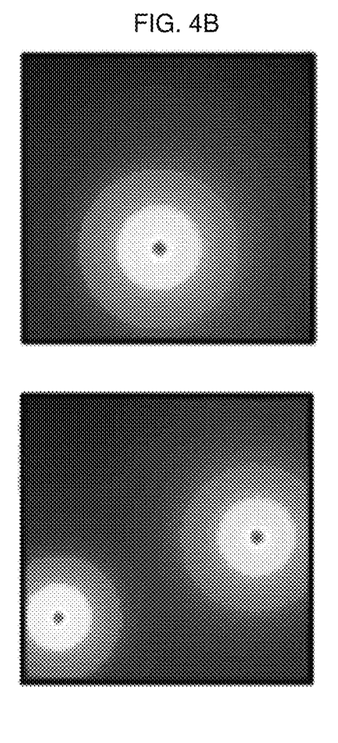
FIG. 4B is a target map which is used as the output value in order to train the neural network and generated by the method of generating a target map according to the embodiment of the present disclosure.

FIG. 4A is a beamforming image used as an input value in order to train a neural network, and FIG. 4B is a target map which is used as the output value in order to train the neural network and generated by the method of generating a target map according to the embodiment of the present disclosure.

FIGS. 4A and 4B show an input value and an output value used to train a neural network by using a target map generated according to the embodiment of the present disclosure.

The input value is used as data inputted in training the neural network. The output value is used as data outputted in training the neural network. That is, a target map generated by the embodiment of the present disclosure corresponds to each beamforming map generated by the same sound source, and is used to train an artificial intelligence neural network.

In this case, the beamforming map is a sound source map formed through a beamforming method, and has various types of sound field information on a sound source. However, since it is impossible for those skilled in the art to predict a position and strength of a sound source based on only a beamforming map, some conversion processes or processing processes are required. However, since a position and strength of a sound source visually appears in a target map generated by the present disclosure, those skilled in the art can predict the position and strength of the sound source based on only the target map.

Figure 5:
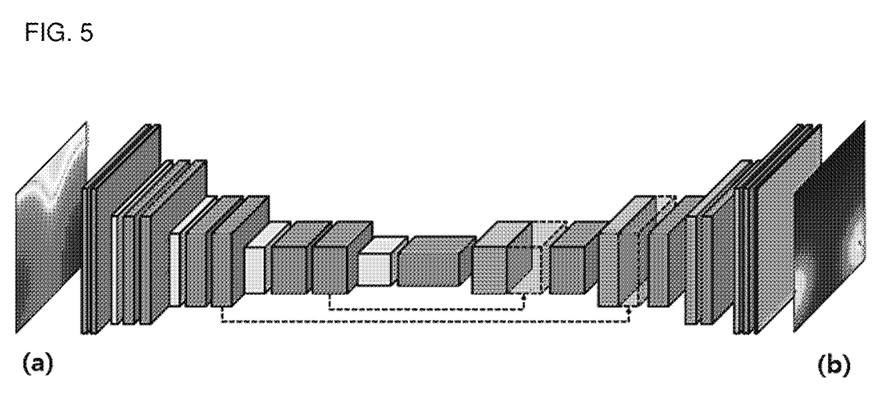
FIG. 5 is an example of an artificial neural network model used in the present disclosure.

FIG. 5 is an example of an artificial neural network model used in the present disclosure.

FIG. 5(a) is a beamforming map inputted to the artificial neural network, and FIG. 5(b) is a target map used to train the artificial neural network or inferred through the artificial neural network.

Referring to FIG. 5, a neural network model used in the present disclosure roughly consists of an encoder network and a decoder network, and has a structure in which a characteristic obtained from the encoder network is transmitted to and used in the decoder network. However, various neural network models, in addition to the model illustrated in FIG. 5, may be used as long as the neural network models each have a structure in which a result value is outputted by comparing data inputted to the encoder network and data including a characteristic extracted from the input data and used for training.

Figure 6:
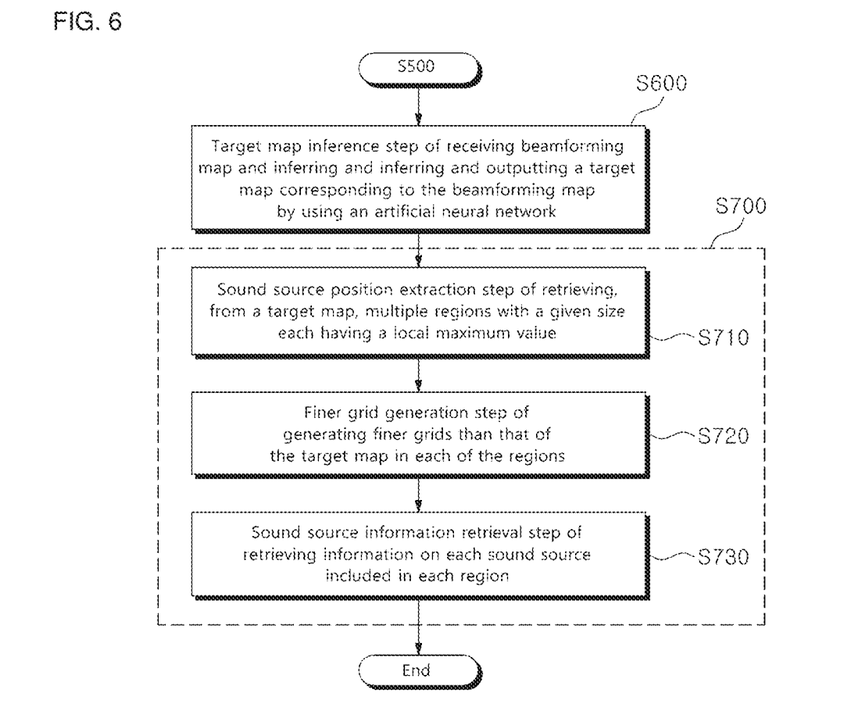
FIG. 6 is a flowchart of a method of obtaining and analyzing a sound source map, which infers and analyzes a target map according to an embodiment of the present disclosure.

FIG. 6 is a flowchart of a process of inferring and analyzing a target map, in the method of obtaining and analyzing a sound source map according to the embodiment of the present disclosure.

Figure 7:
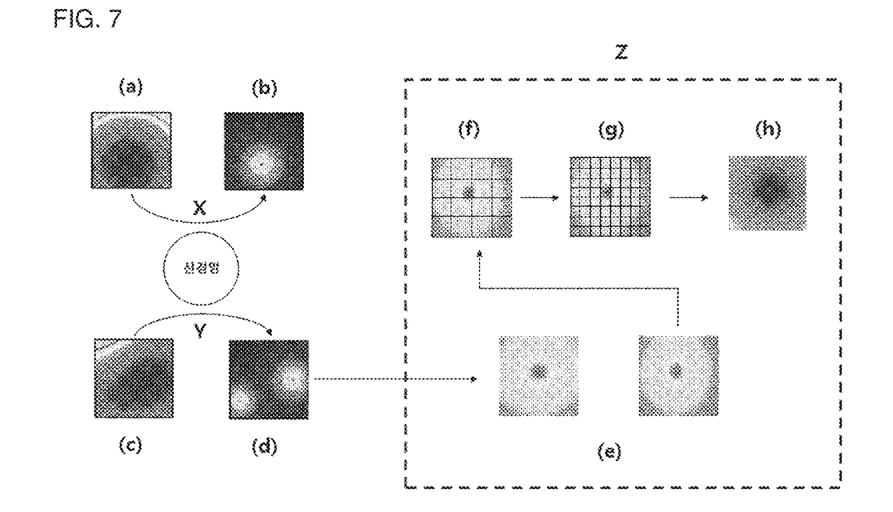
FIG. 7 illustrates a learning, inference and analysis process of a neural network using a target map.

FIG. 7 illustrates a learning, inference and analysis process of a neural network using a target map.

Referring to FIG. 6, the method of obtaining and analyzing a sound source map according to the embodiment of the present disclosure may further include a target map inference step S600 of receiving a beamforming map and inferring and outputting a target map corresponding to the beamforming map by using an artificial neural network and an analysis step S700 of analyzing the target map and retrieving information of a sound source. The information of the sound source means all pieces of information of the sound source including a position and strength of the sound source.

Feature (a) in FIG. 7 is a beamforming map inputted to the artificial neural network as an input value in the neural network training step S500, and feature (b) in FIG. 7 is a target map inputted to the artificial neural network as a comparison result value in the neural network training step S500. That is, the neural network training step S500 is a step X of, when receiving a beamforming map, training the artificial neural network to learn that a target map generated by a sound source having the same strength and position is outputted.

Feature (c) in FIG. 7 is data inputted to the artificial neural network trained in the target map inference step S600, and feature (d) in FIG. 7 is result data outputted by the artificial neural network trained in the target map inference step S600. That is, the target map inference step S600 is a step Y of, when receiving a beamforming map, inferring a target map, generated by a sound source having the same position and strength as that of the received beamforming map, by using a trained artificial neural network. That is, the target map inference step S600 may infer a target map, that is, a sound source map visually indicating information on a sound source, using an artificial neural network trained using a target map generated according to the embodiment of the present disclosure.

Referring to FIG. 6, the analysis step S700 may further include a sound source position extraction step S710 of retrieving, from a target map, multiple regions with a given size each having a local maximum value, a finer grid generation step S720 of generating finer grids than that of the target map in each of the regions, and a sound source information retrieval step S730 of retrieving information on each sound source included in each region.

FIG. 7 more specifically shows the sound source position extraction step S710, the finer grid generation step S720 and the sound source information retrieval step S730.

In the sound source position extraction step S710, a region having the local maximum value, that is, a portion in which a sound source is present, is extracted from a target map "d". The maximum value means that a result value F, that is, data assigned to each coordinate of the target map "d", that is, an image having a matrix form, is significantly greater than those in surrounding coordinates. The reason why a portion in which the result value F is a local maximum value is extracted in order to extract a position of a sound source is that a result value F at a point at which a sound source is present is calculated as a significantly greater value than at a point at which a sound source is not present, by Equation 1, that is, an equation for calculating a result value F in the present disclosure which generates a target map.

The finer grid generation step S720 is a step of narrowing a spacing between grids originally included in a target map. The finer grid generation step is represented as a process of processing an image in FIG. 7(f) into an image of FIG. 7(g). By narrowing the grids on the image, it is possible to allow a position of a point at which a sound source occurs within the image to be present on the grid or it is possible to more specifically analyze pieces of information on influences of a sound source on a surrounding portion of the sound source.

The sound source information retrieval step S730 is a step Z of retrieving and analyzing information of a sound source. All of conventional methods of retrieving and analyzing information of a sound source may be used.

FIG. 7(h) is a beamforming map generated from the target map in FIG. 7(g). The series of processes (the processes from (c) to (h)) illustrated in FIG. 7 show a process of retrieving a beamforming map for each individual sound source from a beamforming map generated by a plurality of sound sources through the method of generating a target map according to the embodiment of the present disclosure.

That is, according to an embodiment of the present disclosure, information on an individual sound source may be retrieved and analyzed from a beamforming map generated by a plurality of sound sources present in a given place (i.e., space).

Figure 8:
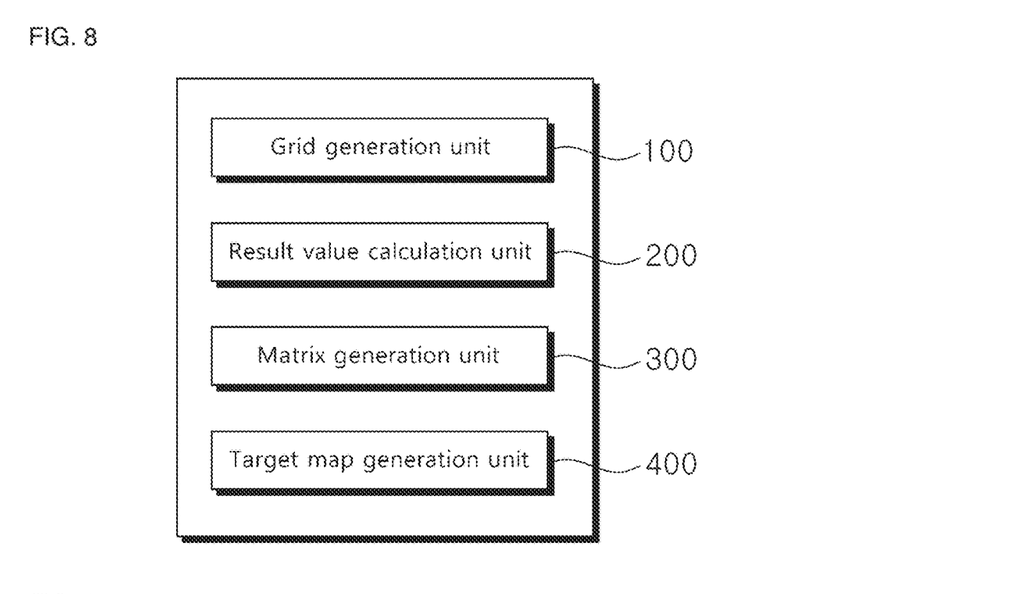
FIG. 8 is a block diagram of the configuration of generating a target map, in a system for obtaining and analyzing a sound source map according to an embodiment of the present disclosure.

FIG. 8 is a block diagram of the configuration of generating a target map, in a system for obtaining and analyzing a sound source map according to an embodiment of the present disclosure.

Referring to FIG. 8, the system for obtaining and analyzing a sound source map according to the embodiment of the present disclosure includes a grid generation unit configured to generate grids each having a spacing within a given range around a sound source, a result value calculation unit configured to calculate a result value for each coordinate of the grid so that a result value is a local maximum at the position of a sound source and the result value decreases depending on the distance from the sound source, a matrix generation unit configured to arrange the result values at positions on matrices corresponding to the respective coordinates of the grids, and a target map generation unit configured to generate a target map having an image form by using the result values arranged in on the matrices.

Figure 9:
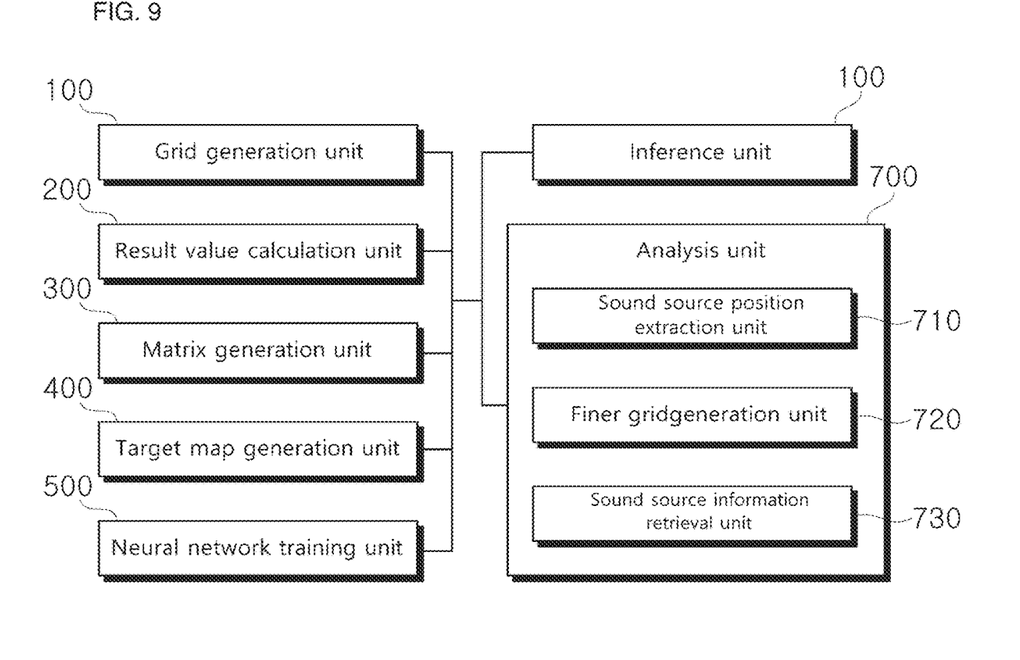
FIG. 9 is a block diagram of a system for obtaining and analyzing a sound source map, which infers and analyzes a target map, according to an embodiment of the present disclosure.

FIG. 9 is a block diagram of a configuration for inferring and analyzing a target map, in the system for obtaining and analyzing a high-resolution sound source map according to an embodiment of the present disclosure.

Referring to FIG. 9, the system for obtaining and analyzing a sound source map according to the embodiment of the present disclosure may further include a target map synthesis unit configured to, when the multiple sound sources are present, generate target maps for the respective sound sources according to a purpose and modification of the present disclosure, and then synthesizing a target map by the summation of the target maps as one target map and/or a neural network training unit configured to designate a beamforming map generated by a sound source as an input value, generate the target map having the same position and strength as the input has, designate the target map as the output value, and train an artificial neural network to output the output value when receiving the input value.

The system for obtaining and analyzing a sound source map according to the embodiment of the present disclosure may further include an inference unit 600 configured to receive a beamforming map and infer and output a target map corresponding to the beamforming map by using an artificial neural network and an analysis unit 700 configured to analyze the target map and retrieve information of the sound source.

The analysis unit 700 may further include a sound source position extraction unit 710 configured to extract, from the target map, multiple regions each having a given size and having a local maximum value, a finer grid generation unit 720 configured to generate finer grids than that of the target map in each of the regions, and a sound source information retrieval unit 730 configured to analyze information for each sound source included in each of the regions.

The aforementioned contents of the method may be applied to the system according to the embodiment of the present disclosure. Accordingly, in relation to the system, a description of the same contents as the aforementioned contents of the method is omitted.

As described above, embodiments of the present disclosure have been described. The present disclosure is not limited to constructions of a method and system for analyzing a period signal of such embodiments, and may be variously modified and changed within a range written in the claims.

The invention claimed is:

1. A method of obtaining and analyzing a high-resolution sound source map using an artificial intelligence neural network, the method comprising:

a grid generation step of generating grids, via software executing on a processing unit, each having an interval within a given range at locations where sound sources are present, in order to form a computer generated sound source map including a plurality of pixels;

a calculation step of calculating a result value for each of coordinates of the grids, wherein the result value is a maximum at a location of the sound source and the result value is decreased based on a distance from the sound source;

a matrix generation step of arranging the result values at locations on matrices corresponding to the respective coordinates of the grids; and a target map generation step of generating a target map having an image form by using the result values arranged in the matrix.

2. The method of claim 1, wherein the result value is defined through Equation 1 below:

$$f(R) = \frac{\varepsilon}{R^N + \varepsilon}$$

wherein R means a distance between the sound source and the grid and N and ε mean constants).

3. The method of claim 1, wherein the target map generation step further comprises, when the sound source is present in plural, a target map synthesis step of generating target maps for the respective sound sources and then synthesizing the target maps as one target map.

4. The method of claim 1, further comprising a neural network training step of:
designating, as a comparison input value, a beamforming map generated by a sound source having a location and intensity identical with a location and intensity of a sound source used to generate the target map,
designating the target map as a comparison output value, and
training an artificial neural network to output the comparison output value corresponding to the comparison input value when receiving an image identical with an image of the comparison input value.

5. The method of claim 4, further comprising:
a target map inference step of receiving the beamforming map and inferring and outputting a target map corresponding to the beamforming map by using the artificial neural network; and
an analysis step of analyzing the target map and extracting information of the sound source.

6. The method of claim 5, wherein the analysis step further comprises:
a sound source location extraction step of extracting, from the target map, a plurality of regions each having a given size and comprising a point at which the result value is a maximum value;
a grid split step of splitting each of the regions into regions each having an interval smaller than that of the grid of the target map; and
a sound source information analysis step of analyzing information on each sound source included in each region.

7. A non-transitory computer-readable recording medium on which a program for implementing the method according to claim 1 has been recorded.

8. A system for obtaining and analyzing a high-resolution sound source map using an artificial intelligence neural network, the system comprising:
a grid generation unit, including software executing on a processor unit, configured to generate grids each having an interval within a given range around sound sources, in order to form a computer generated sound source map including a plurality of pixels;
a result value calculation unit, including software executing on a processor unit, configured to calculate a result value for each coordinate of the grid, wherein a result value is a maximum at a location of the sound source and the result value is decreased based on a distance from the sound source;
a matrix generation unit, including software executing on a processor unit, configured to arrange the result values at locations on matrices corresponding to the respective coordinates of the grids; and
a target map generation unit, including software executing on a processor unit, configured to generate a target map having an image form by using the result values arranged in on the matrices.

9. The system of claim 8, wherein the result value is defined through Equation 1 below:

$$f(R) = \frac{\varepsilon}{R^N + \varepsilon}$$

(wherein R means a distance between the sound source and the grid, and N and ε mean constants).

10. The system of claim 8, further comprising a target map synthesis unit, wherein, when the sound source is present in plural, the target map synthesis unit generates target maps for the respective sound sources and synthesizes the target maps as one target map.

11. The system of claim 8, further comprising a neural network training unit configured to designate, as a comparison input value, a beamforming map generated by a sound source having a location and intensity identical with a location and intensity of a sound source used to generate the target map, designate the target map as a comparison output value, and train an artificial neural network to output the comparison output value corresponding to the comparison input value when receiving an image identical with an image of the comparison input value.

12. The system of claim 11, further comprising:
an inference unit configured to infer and output the beamforming map as the target map corresponding to the beamforming map by using the artificial neural network; and
an analysis unit configured to analyze the target map and extract information of the sound source.

13. The system of claim 12, wherein the analysis unit further comprises:
a sound source location extraction unit configured to extract, from the target map, a plurality of regions each having a given size and comprising a point at which the result value is a maximum value;
a grid split unit configured to split each of the regions into regions each having an interval smaller than that of the grid of the target map; and
a sound source information analysis unit configured to analyze information for each sound source included in each of the regions.

* * * * *